Nov. 17, 1953  F. A. DUFFY, JR  2,659,410
ELECTRICAL CONDUIT BENDING AND STRAIGHTENING DEVICE
Filed June 8, 1951  2 Sheets-Sheet 1

Frank A. Duffy, Jr.
INVENTOR.

Nov. 17, 1953 F. A. DUFFY, JR 2,659,410
ELECTRICAL CONDUIT BENDING AND STRAIGHTENING DEVICE
Filed June 8, 1951 2 Sheets-Sheet 2

Frank A. Duffy, Jr.
INVENTOR.

BY *Clarence A. O'Brien*
*and Harvey B. Jackson*
Attorneys

Patented Nov. 17, 1953

2,659,410

UNITED STATES PATENT OFFICE 2,659,410

ELECTRICAL CONDUIT BENDING AND STRAIGHTENING DEVICE

Frank A. Duffy, Jr., Kansas City, Mo.

Application June 8, 1951, Serial No. 230,590

5 Claims. (Cl. 153—32)

1

The present invention relates to conduit bending machines and more particularly to a device which can be employed for both effecting bending of conduits and for straightening bent conduits.

An object of the present invention is to provide a conduit bending machine which includes a bed plate upon which the conduit to be bent or straightened is disposed, the bed plate having a pair of upstanding elements or standards secured thereto for swingably supporting a quadrant, means being provided for effecting movement of the quadrant relative to the bed plate along with the conduit for bending the conduit or for effecting movement of the bed plate and quadrant relative to the conduit whereby a bent conduit can be straightened.

Another object of the present invention resides in the novel construction of the conduit bending device whereby the conduit can be easily bent by effecting a pumping action by manual means controlling a hydraulic cylinder which is actuated for effecting relative movement between elements of the device.

Still further objects of the present invention reside in the novel construction of the bed plate and carriage associated therewith, along with the links interconnecting the quadrant with the carriage, and also the plunger structure which effects relative movement between the carriage and said bed plate.

Various other objects and advantages will become apparent from the detailed description to follow. The best form in which I have contemplated applying my invention is clearly illustrated in the accompanying drawings, wherein.

Figure 1:
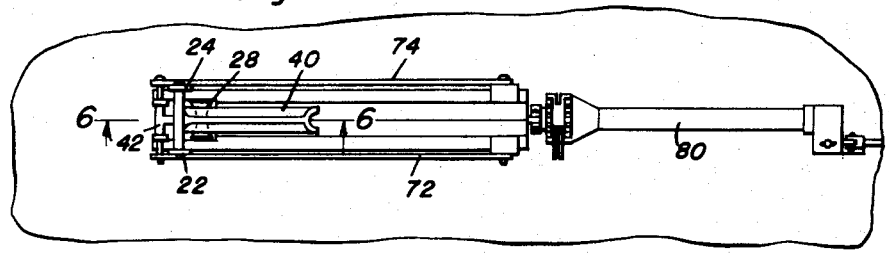
Figure 1 is a top plan view of the conduit bending device.
Figure 2:
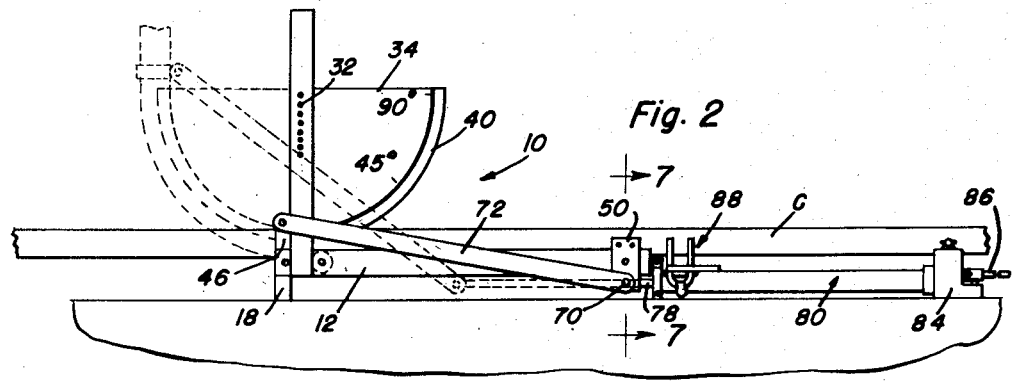
Figure 2 is a side elevational view of the conduit bending device shown with a conduit mounted therein preparatory to bending the same.

2 taken substantially along the plane of line 7—7 of Figure 2; and

Figure 6:
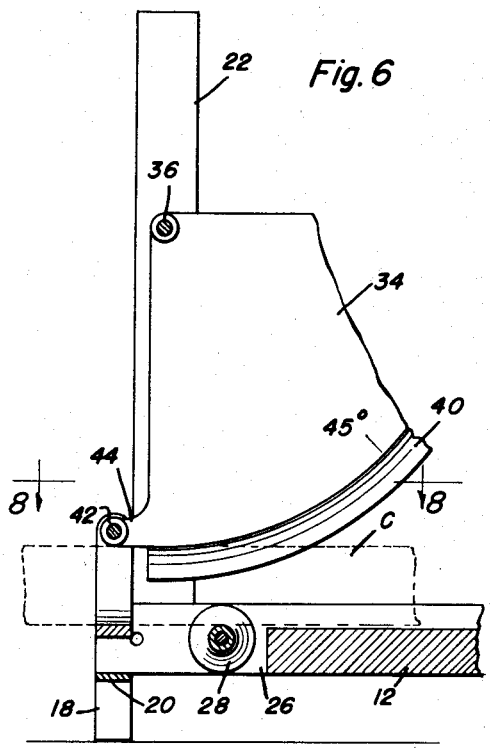
Figure 6 is a vertical longitudinal sectional view taken substantially along the plane of line 6—6 of Figure 1.
Figure 8:
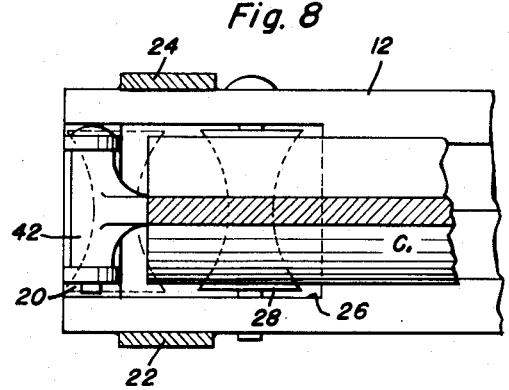

Figure 8 is a horizontal sectional view taken substantially along the plane of line 8—8 of Figure 6.

Referring more particularly to the drawings, wherein like numerals designate like parts throughout, the numeral 10 designates generally the conduit bending device of the present invention.

The conduit bending device is comprised of a bed plate 12 which is of substantially rectangular cross-section and has its upper surface 14 formed with a V-shaped groove or recess 16 adapted to receive a conduit C therein. The bed plate 12 is formed with a pair of downwardly extending legs 18 joined by the web 20 for supporting the bed plate at one end. The bed plate 12 is also formed with a pair of standards 22 and 24 which are fixedly secured on opposing sides of one end of the bed plate 12 and are in upstanding parallel relation to each other.

As seen best in Figure 8, the bed plate 12 is formed with a recess 26 in which is rotatably journaled a roller 28 whereby the conduit C can be engaged thereover. The opposing end of the bed plate 12 is formed with an apertured ear 30 for a purpose to be more fully understood hereinafter.

The standards 22 and 24 are formed with a plurality of apertures 32 whereby the quadrant 34 can be adjustably rotatably supported thereby, a pin 36 extending through the pair of standards 22 and 24 and the bearing sleeve 38 of the quadrant 34. The peripheral portion 40 of the quadrant 34 is grooved to conform substantially to the contour of the conduit C, which of course may vary in size. At an end peripheral portion of the quadrant 34, a second sleeve 42 is formed, as at 44. A substantially U-shaped clamp has its free ends engageable with opposing ends of the sleeve 42 and is adapted to embrace the conduit C, a pin 48 being adapted to be disposed through the legs of the U-shaped clamp 46 and the sleeve 42.

Figure 4:
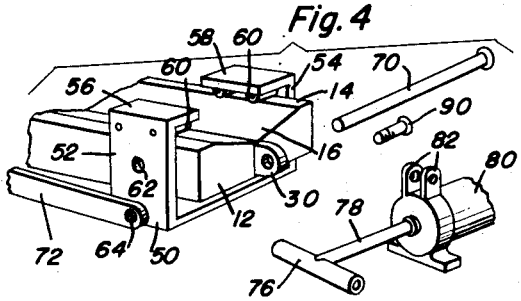
Figure 4 is a detail perspective and exploded view of several of the elements which comprise a portion of the invention.
Figure 5:
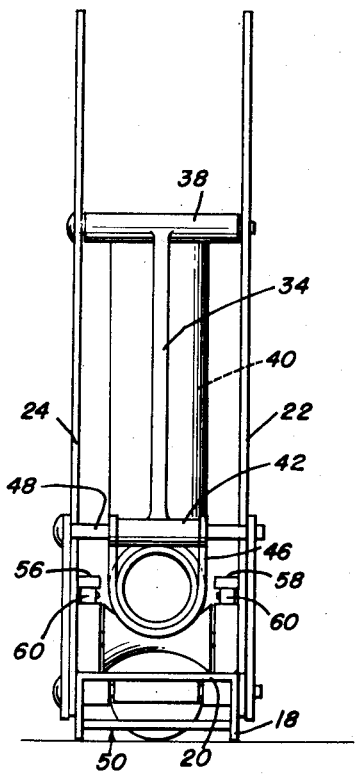
Figure 5 is a left end elevational view of Figure 6.
Figure 7:
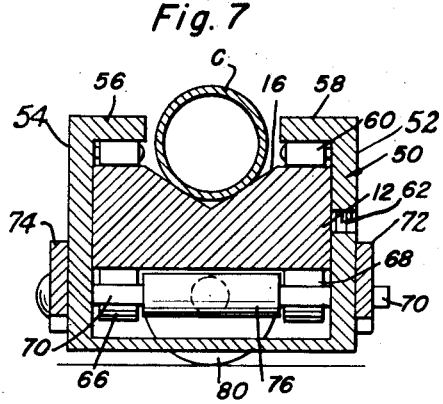
Figure 7 is a vertical transverse sectional view

As seen best in Figures 4 and 7, a carriage 50 is provided for slidable engagement over the bed plate 12. The carriage 50 is of substantially U-shaped form having opposing leg portions 52 and 54, the upper free end portions of the legs 52 and 54 being horizontally angulated at 56 and 58. A plurality of rollers 60 are rotatably carried by the legs 52 and 54 for engagement with the upper surface 14 of the bed plate 12. The leg 52 is formed with threaded aperture 62 for a purpose to be more fully understood hereinafter.

Looking now at Figure 7, it will be seen that the bed plate 12 has a pair of bearing ears 66 and 68 secured thereto and in aligned relation. The pin 70 is engaged through apertures 64 in the adjacent ends of a pair of links 72 and 74, and extends through aligned apertures (not shown) in the carriage 50 and selectively through the bearings 66 and 68 and/or the sleeve 76 of the plunger 78 of the hydraulic cylinder 80. The opposing ends of the links 72 and 74 have the pin 48 extending therethrough, which pin is also extended through the free ends of the legs of the U-shaped clamp 26 and the sleeve 42 of the quadrant 34.

The hydraulic cylinder 80 is substantially conventional but has its forward end formed with a pair of upstanding ears 82, the opposing end of the cylinder 80 having a miniature pump 84 associated therewith and operated by the handle 86. The hydraulic cylinder also has a conventional plumber's chain clamp, indicated generally by the numeral 88, associated therewith whereby the conduit C can be clamped to the cylinder 80 if desired.

When it is desired to effect bending of the conduit C, the arrangement is as in Figure 2. The conduit C is disposed in the V-shaped groove of the bed plate 12 and has a portion thereof clamped within the U-shaped clamp 46. The links 72 and 74 have their ends secured to the U-shaped clamp 46 by the pin 48 for movement with the quadrant 34. The opposing ends of the links 72 and 74 are secured to the carriage 50 by means of the pin 70 which pin does not pass through ears 66 and 68 but does pass through the sleeve 76 of the T-shaped plunger of the hydraulic cylinder. The ear 30 of the bed plate 12 is secured between the pair of ears 82 by means of the pin 90 whereby the bed plate 12 will be retained in fixed relation to the hydraulic cylinder 80. Thus, as the pump handle 86 is actuated, the pump 84 will supply fluid to the hydraulic cylinder 80 thereby effecting outward movement of the plunger 78. Thus, the carriage 50 and links connected thereto will be moved longitudinally of the bed plate 12 and the quadrant 34 will be made to rotate about the pin 36 engaged between the standards 22 and 24. Since the conduit is in constant relation to the quadrant, it will be bent upon movement of the quadrant.

Figure 3:
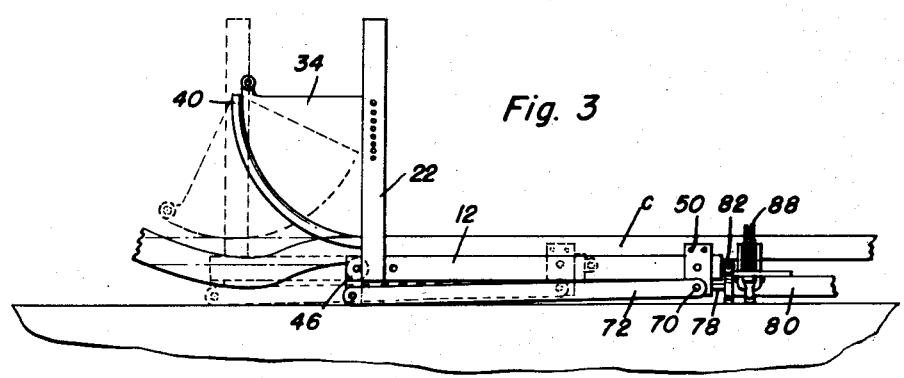
Figure 3 is a view similar to Figure 2 but wherein the conduit bending device has a bent conduit mounted therein preparatory to straightening the same.

When it is desired to straighten a bent conduit, the arrangement is as in Figure 3. A set screw can be engaged in the aperture 62 for securing the carriage 50 for movement with the bed plate 12 whereby relative movement is prevented. Also, the pin 70 can be engaged through the pair of ears 66 and 68 secured to the bed plate 12 and the sleeve 76 of the piston plunger being carried by the pin 70 whereby movement of the plunger will effect movement of both the carriage 50 and the bed plate 12.

The conventional plumber's chain clamp 88 is engaged over the conduit C and the conduit is clamped to prevent relative movement between the conduit and the hydraulic cylinder 80. The links 72 and 74 are not connected to the quadrant 34 nor is the U-shaped clamp 46 engaged over the conduit. The pump handle 86 is then actuated, thereby effecting outward movement of the plunger of the hydraulic cylinder. The bed plate 12 and carriage 50 will therefore move relative to the hydraulic cylinder 80 and the conduit C, the quadrant 34 rolling over the conduit C and effecting straightening thereof since the conduit passes between the quadrant 34 and the V-shaped groove 16 of the bed plate 12.

In view of the foregoing description, taken in conjunction with the drawings, it is believed that a conduit bending device has been provided which will effectively accomplish the functions of bending and straightening conduits as desired. In view of the simplicity of the device, further description thereof is deemed unnecessary.

Having described the invention, what is claimed as new is:

1. A conduit bending device comprising an elongated and longitudinally recessed bed plate adapted to receive a conduit in the recess thereof, a pair of standards fixedly secured to said bed plate on opposite sides of one end thereof and in parallel relation to each other, a quadrant pivotally carried by said standards and adapted to have the conduit received in the bed plate recess engaged against its periphery, and means for effecting longitudinal movement of said bed plate relative to the conduit, said means including a fluid pressure cylinder with a piston and plunger reciprocably carried thereby, said cylinder having a conventional clamp carried thereby whereby the conduit can be secured from movement relative to said cylinder, said plunger being connected to said bed plate for effecting longitudinal movement thereof whereby a bent conduit can be straightened.

2. A conduit bending and straightening device comprising an elongated, longitudinally recessed bed plate, a pair of spaced, parallel standards fixedly secured to opposite sides of said bed plate at one end thereof, a quadrant pivotally carried by said standards and overlying said bed plate, a carriage slidably mounted on said bed plate, link members pivotally secured to said carriage and being disposed on both sides of said bed plate and hydraulic means selectively connected to said carriage and said bed plate for respectively moving said carriage and said bed plate, said links having their free ends terminating adjacent said quadrant and being associated therewith.

3. A conduit bending and straightening device comprising an elongated, longitudinally recessed bed plate, a pair of spaced, parallel standards fixedly secured to opposite sides of said bed plate at one end thereof, a quadrant pivotally carried by said standards and overlying said bed plate, a carriage mounted on said bed plate, link members pivotally secured to said carriage and being disposed on both sides of said bed plate, said links having their free ends terminating adjacent said quadrant and being selectively connected thereto, and hydraulic means connected to said carriage for moving said carriage, said carriage being selectively movable with and relative to said bed plate.

4. The combination of claim 3 wherein said standards are provided with a plurality of longitudinally spaced apertures for adjustably mounting said quadrant at varying heights above said bed plate.

5. A conduit bending and straightening device comprising an elongated, longitudinally recessed bed plate, support means fixedly secured to opposite sides of said bed plate adjacent one end thereof, a quadrant pivotally carried by said support means and overlying said bed plate, a carriage mounted on said bed plate, link members pivotally secured to said carriage and being disposed on both sides of said bed plate, said links having their free ends terminating adjacent said quadrant and being selectively connected thereto, and means connected to said carriage for moving the same, said carriage being selectively movable with and relative to said bed plate.

FRANK A. DUFFY, Jr.

References Cited in the file of this patent

UNITED STATES PATENTS

| Number | Name | Date |
|---|---|---|
| 91,592 | Ayres | June 22, 1869 |
| 420,576 | Heesom | Feb. 4, 1890 |
| 499,355 | Crossley | June 13, 1893 |
| 749,013 | Anderson | Jan. 5, 1904 |
| 1,135,875 | Brinkman | Apr. 13, 1915 |
| 1,285,987 | Grunhow | Nov. 26, 1918 |
| 1,403,887 | Alger | Jan. 17, 1922 |
| 1,526,969 | Ericksson | Feb. 17, 1925 |
| 1,565,001 | Bayer | Dec. 8, 1925 |
| 1,650,955 | Miller | Nov. 29, 1927 |
| 1,795,151 | Smith | Mar. 3, 1931 |
| 2,357,006 | Johnson | Aug. 29, 1944 |

FOREIGN PATENTS

| Number | Country | Date |
|---|---|---|
| 126,845 | Great Britain | May 22, 1919 |